US012688811B2

(12) United States Patent
Ke et al.

(10) Patent No.: US 12,688,811 B2
(45) Date of Patent: Jul. 21, 2026

(54) GATE DRIVING CIRCUIT AND DISPLAY DEVICE

(71) Applicant: Guangzhou China Star Optoelectronics Semiconductor Display Technology Co., LTd., Guangzhou (CN)

(72) Inventors: Jhongciao Ke, Guangzhou (CN); Yanrui Lin, Guangzhou (CN)

(73) Assignee: Guangzhou China Star Optoelectronics Semiconductor Display Technology Co., LTd., Guangzhou (CN)

( * ) Notice: Subject to any disclaimer, the term of this patent is extended or adjusted under 35 U.S.C. 154(b) by 0 days.

(21) Appl. No.: 19/273,104

(22) Filed: Jul. 17, 2025

(65) Prior Publication Data

US 2026/0188161 A1 Jul. 2, 2026

(30) Foreign Application Priority Data

Dec. 31, 2024 (CN) .......................... 202411997432.4

(51) Int. Cl.
*G09G 3/20* (2006.01)
*G06F 3/041* (2006.01)

(52) U.S. Cl.
CPC ............. *G09G 3/20* (2013.01); *G06F 3/0416* (2013.01); *G06F 3/0412* (2013.01); *G09G 2310/0286* (2013.01); *G09G 2310/08*

(2013.01); *G09G 2320/0233* (2013.01); *G09G 2320/043* (2013.01); *G09G 2354/00* (2013.01)

(58) Field of Classification Search
CPC ......... G09G 2310/0286; G09G 3/3266; G09G 2310/0267; G06F 3/0412; G06F 3/04166; G06F 3/044; G06F 3/0416; G06F 3/041
See application file for complete search history.

(56) References Cited

U.S. PATENT DOCUMENTS 10,121,401 B2 * 11/2018 Lin ..................... G06F 3/04184

* cited by examiner

*Primary Examiner* — Koosha Sharifi-Tafreshi
(74) *Attorney, Agent, or Firm* — PV IP PC; Peter Stecher; Wei Te Chung

(57) ABSTRACT

A gate driving circuit and a display device are provided by the present disclosure. The gate driving circuit includes a first node control circuit, a first maintaining circuit, a first output circuit, and a first node voltage-stabilizing circuit. The first node control circuit is configured to control a voltage level of a first node. The first maintaining circuit is configured to maintain the voltage level of the first node according to a voltage level of a second node. The first output circuit is configured to output a gate signal from a gate signal output terminal according to the voltage level of the first node. The first node voltage-stabilizing circuit is configured to be turned on, during a touch stage, according to a first level of a touch signal to control the voltage level of the second node, such that the first maintaining circuit is turned off.

20 Claims, 3 Drawing Sheets

100

GATE DRIVING CIRCUIT AND DISPLAY DEVICE

CROSS-REFERENCE TO RELATED APPLICATION

This application claims priority to Chinese Patent Application No. 202411997432.4 filed on Dec. 31, 2024, the disclosure of which is herein incorporated by references in its entirety.

TECHNICAL FIELD

The present disclosure relates to the field of display technologies, and more particular to a gate electrode driving circuit and a display device.

BACKGROUND

Generally speaking, a gate driving circuit in a display device is composed of multi-stage gate driving units connected in series, and each stage of the gate driving units is used to output a gate driving signal, and a corresponding pixel row is turned on by the gate driving signal, so that each pixel in the pixel row can be written with a required display data.

However, in a touch state, the touch signal may affect the gate driving signal output by the gate driving circuit, thereby causing display abnormality.

SUMMARY

A gate driving circuit and a display device are provided by the embodiments of the present disclosure, so as to improve a problem of display abnormality caused by leakage of a voltage level of a first node of the gate driving circuit, which can solve at least some of above-mentioned problems.

In a first aspect, a gate driving circuit is provided by the embodiments of the present disclosure. The gate driving circuit includes a first node control circuit, a first maintaining circuit, a first output circuit, and a first node voltage-stabilizing circuit. The first node control circuit is configured to control a voltage level of a first node. The first maintaining circuit is configured to maintain the voltage level of the first node according to a voltage level of a second node. The first output circuit is configured to output a gate signal from a gate signal output terminal according to the voltage level of the first node. The first node voltage-stabilizing circuit is configured to be turned on, during a touch stage, according to a first level of a touch signal input from a touch signal input terminal to control a voltage level of the second node, such that the first maintaining circuit is turned off to stabilize the voltage level of the first node.

In a second aspect, a display device is further provided by the embodiments of the present disclosure. The display device includes the gate driving circuit mentioned above.

In the gate driving circuit and the display device according to the embodiments of the present disclosure, the first node voltage-stabilizing circuit improves the problem of leakage of the first node through the first maintaining circuit during the touch stage, so that the voltage level of the first node during the touch stage is stabilized, and the problem of display abnormality caused by leakage of the voltage level of the first node of the gate driving circuit is further alleviated.

Figure 1:
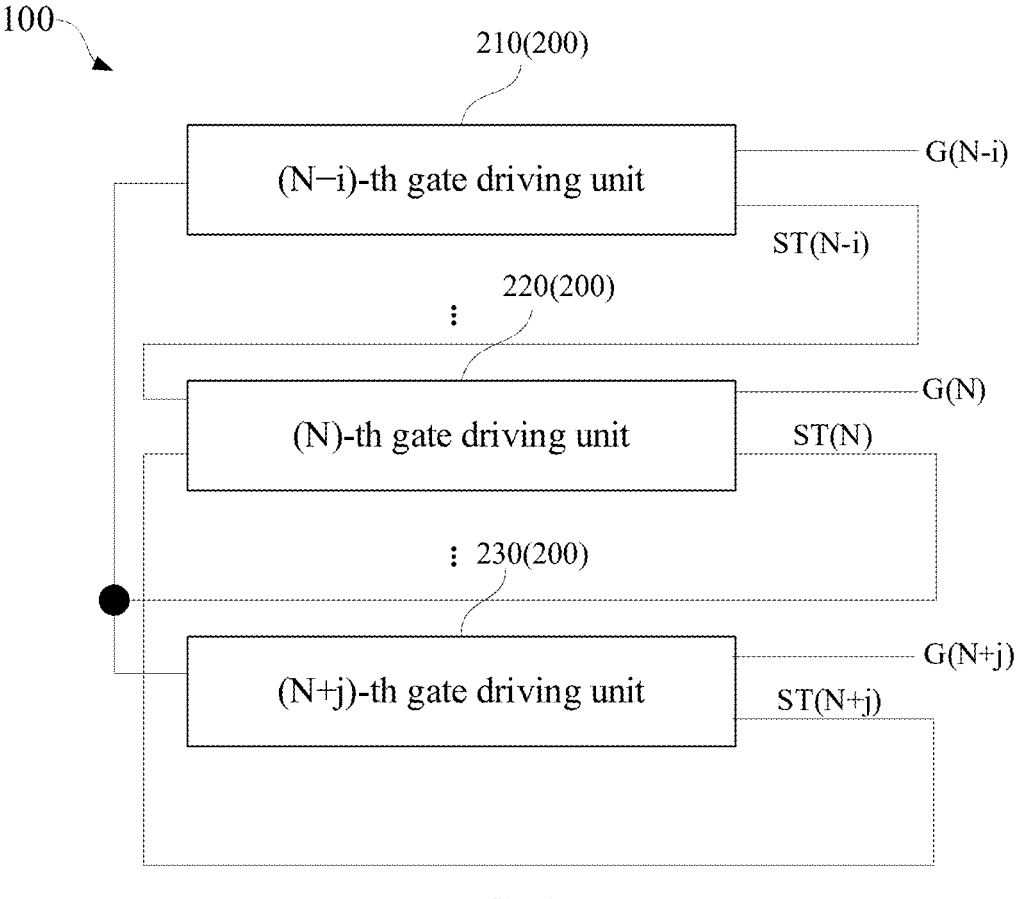
FIG. 1 is a schematic structural diagram of a gate driving circuit according to some embodiments of the present disclosure.

Reference numerals in drawings are illustrated as follows:
  100, gate driving circuit;
  200, gate driving unit; 210, (N−i)-th gate driving unit; 220, N-th stage gate driving unit; 230, (N+j)-th gate driving unit;
  301, first node control circuit; T11, first node control transistor;
  302, first maintaining circuit; T42/T43, first maintaining transistor;
  303, first output circuit; T21, first output transistor; T31, second output transistor;
  304, first node voltage-stabilizing circuit; T91/T92, first node voltage-stabilizing transistor;
  305, reset circuit; TrQ, reset transistor;
  306, second maintaining circuit; T41, second maintaining transistor;
  307, second node control circuit; 3071, first inverter; 3072, second inverter T51/T61, first transistor; T52/T62, second transistor; T54/T64, third transistor; T53/T63, fourth transistor;
  308, third maintaining circuit; T32/T33, third maintaining transistor;
  309, second output circuit; T22, third output transistor;
  310, fourth maintaining circuit; T72/T73, fourth maintaining transistor;
  311, touch voltage-stabilizing circuit; T81, touch voltage-stabilizing transistor;
  Cb, capacitor;
  VGL, first voltage input terminal;
  TP, touch signal input terminal;
  ST(N+j), first stage transmission signal; ST(n+j), first stage transmission signal input terminal;
  ST(N−i), second stage transmission signal; ST(n−i), second stage transmission signal input terminal;
  ST(N), third stage transmission signal; ST(n), third stage transmission signal output terminal;
  CK(n), clock signal input terminal;
  G(n), gate signal output terminal; Reset, reset signal input terminal;
  LC1/LC2, second voltage input terminal;
  Q(n), first node; K(n)/P(n), second node;
  400, display device; 500, display panel; 501, substrate; 502, opposite substrate; 503, pixel electrode layer; 504, driving circuit layer; 600, touch layer.

DETAILED DESCRIPTION

The technical solution in the embodiments of the present disclosure will be clearly and completely described with reference to the accompanying drawings. Apparently, the described embodiments are merely some embodiments of the present disclosure instead of all embodiments. According to the embodiments in the present disclosure, all other embodiments obtained by those skilled in the art without making any creative effort shall fall within the protection scope of the present disclosure.

Referring to FIG. 1, a gate driving circuit 100 is provided by the embodiments of the present disclosure. The gate driving circuit 100 is applied to a display panel. The display panel includes a touch layer. In other words, the gate driving circuit 100 is applied to the display panel having a touch function.

The display panel may be at least one of a liquid crystal display panel, an organic light-emitting diode display panel, a micro light-emitting diode display panel, a sub-millimeter light-emitting diode display panel, or a quantum dot display panel. The touch layer may be integrated inside the display panel. The touch layer may also be externally mounted outside the display panel.

The gate driving circuit 100 includes a plurality of gate driving units 200. The plurality of gate driving units 200 are used for outputting multi-stage scanning signals. For example, referring to FIG. 1, the plurality of gate driving units 200 include a (N−i)-th gate driving unit 210, an N-th stage gate driving unit 220, and a (N+j)-th gate driving unit 230, where i and j are integers greater than or equal to 1, and N is an integer greater than or equal to 2. The (N+j)-th gate driving unit 230 outputs a scanning signal G (N+j) and a first stage transmission signal ST(N+j). The (N−i)-th gate driving unit 210 outputs a scanning signal G (N−i) and a second stage transmission signal ST(N−i). The N-th stage gate driving unit 220 outputs a scanning signal G (N) and a third stage transmission signal ST(N). The first stage transmission signal ST(N+j) is a subsequent stage transmission signal to the third stage transmission signal ST(N). The second stage transmission signal ST(N−i) is a previous stage transmission signal of the third stage transmission signal ST(N).

In order to describe the technical solution of the embodiments of the present disclosure, it will be described hereinafter by taking the N-th stage of the gate driving unit as an example, where N is an integer greater than or equal to 2.

Figure 2:
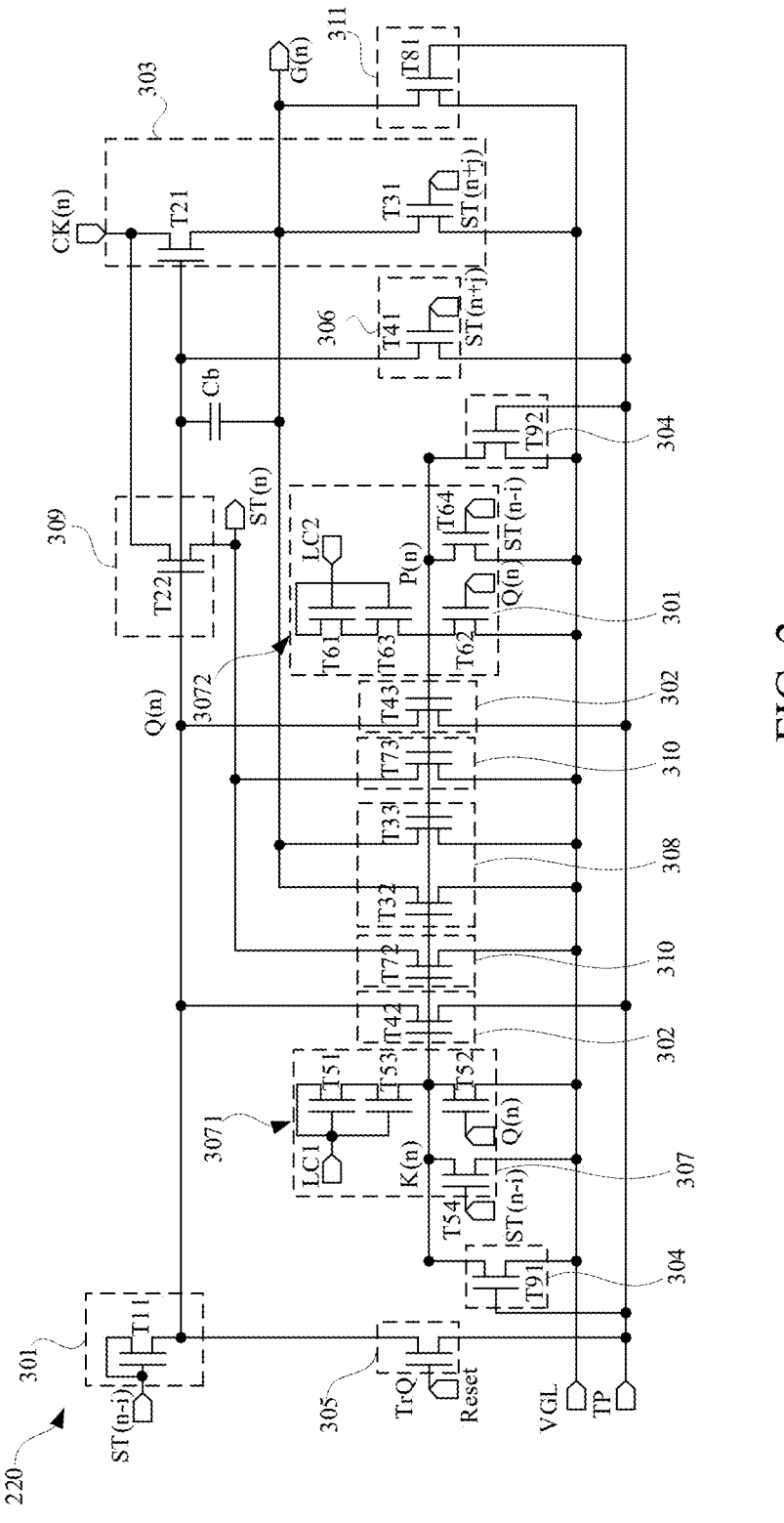
FIG. 2 is a schematic circuit diagram of an N-th stage gate driving unit according to some embodiments of the present disclosure.

Referring to FIG. 2, the gate driving circuit 100 includes a first node control circuit 301, a first maintaining circuit 302, a first output circuit 303, and a first node voltage-stabilizing circuit 304.

The first node control circuit 301 is configured to control a voltage level of a first node Q(n). The first maintaining circuit 302 is configured to maintain the voltage level of the first node Q(n) according to a voltage level of a second node (K(n), P(n)). The first output circuit 303 is configured to output a gate signal from a gate signal output terminal G(n) according to the voltage level of the first node Q(n). The first node voltage-stabilizing circuit 304 is configured to be turned on, during a touch stage, according to a first level of a touch signal input from a touch signal input terminal TP to control the voltage level of the second node (K(n), P(n)), such that the first maintaining circuit 302 is turned off to stabilize the voltage level of the first node Q(n).

The first node voltage-stabilizing circuit 304 of the gate driving unit 200 pulls down the voltage level of the second node (K(n), P(n)) to a low level according to the first level of the touch signal, and the first maintaining circuit 302 is turned off according to the low level of the second node (K(n), P(n)), thereby alleviating the problem of leakage of the first node Q(n) through the first maintaining circuit 302 during the touch stage, stabilizing the voltage level of the first node Q(n) during the touch stage, and further alleviating the problem of display abnormality caused by leakage of the voltage level of the first node Q(n).

It should be noted that during the touch stage, in order to reduce the influence of touch on a display process, a pause operation is generally performed during a process for selecting the scanning lines. For example, the process of the gate driving circuit outputting turn-on scanning signals to the selected scanning lines is paused. However, during a pre-charge stage of the first node of a current-stage gate driving circuit, the first node is at a high potential, and the pause operation may cause the risk of leakage of the first node. A level of a current-stage stage transmission signal output is relatively low due to the leakage of the first node, which will cause a decrease in the charging rate of the lower-stage gate driving circuit charged according to the current-stage stage transmission signal, or cause the lower-stage gate driving circuit to be unable to be turned on according to the current-stage stage transmission signal, resulting in problems of display abnormality such as horizontal stripes or black rows.

Furthermore, for unselected scanning lines, when the voltage level of the first node of the gate driving unit connected to the unselected scanning lines is at a low level, the voltage level of the second node is at a high level. Under a condition that the first node voltage-stabilizing circuit 304 is not added, the first maintaining circuit 302 is turned on according to the high level of the second node, so that the voltage level of the first node Q(n) is pulled down to the low level.

In the embodiments of the present disclosure, regardless of the gate driving unit connected to the selected scanning lines or the gate driving unit connected to the unselected scanning lines, during the touch stage, the first node voltage-stabilizing circuit 304 added pulls down the voltage level of the second node (K(n), P(n)) according to the first level of the touch signal, and the first maintaining circuit 302 is in a turn-off state according to the pulled down voltage level of the second node (K(n), P(n)), so that the first node Q(n) hardly leaks from the first maintaining circuit 302. As such, after the first node Q(n) is switched from the pre-charge stage of a display stage to the touch stage, the voltage level of the first node Q(n) during the touch stage is almost stably unchanged, and the problems of display abnormality such as the horizontal stripes or the black rows due to leakage, when the first node Q(n) is switched from the pre-charge stage of the display stage to the touch stage, are alleviated.

In some embodiments, the first node voltage-stabilizing circuit 304 is further configured to be turned off according to a second level of the touch signal, and the touch signal is input from the touch signal input terminal TP during the display stage. The second level is less than the first level. As a result, the first node voltage-stabilizing circuit 304 is turned on during the touch stage according to the high-level of the touch signal, and the first node voltage-stabilizing circuit 304 is turned off during the display stage according to the low level of the touch signal, thereby alleviating the problem of display abnormality caused by leakage of the voltage level of the first node Q(n) during the touch stage, and reducing the influence of the first node voltage-stabilizing circuit 304 on the display process.

In some embodiments, the first node voltage-stabilizing circuit 304 includes a first node voltage-stabilizing transistor (T91, T92). A source and a drain of the first node voltage-stabilizing transistor (T91, T92) are connected between the second node (K(n), P(n)) and a first voltage input terminal VGL. A gate of the first node voltage-stabilizing transistor (T91, T92) is connected to the touch signal input terminal TP.

In some embodiments, the first voltage input terminal VGL is configured to input a first level signal. The first level signal includes a low level.

In some embodiments, the first node voltage-stabilizing circuit 304 may include one or more first node voltage-stabilizing transistors (T91, T92).

In one example embodiment, as shown in FIG. 2, the first node voltage-stabilizing circuit 304 may include a first node voltage-stabilizing transistor T91 and a first node voltage-stabilizing transistor T92. The first node voltage-stabilizing transistor T91 and the first node voltage-stabilizing transistor T92 periodically operate alternately. A source and a drain of the first node voltage-stabilizing transistor T91 are connected between the second node K(n) and the first voltage input terminal VGL. A source and a drain of the first node voltage-stabilizing transistor T92 are connected between the second node P(n) and the first voltage input terminal VGL. Both a gate of the first node voltage-stabilizing transistor T91 and a gate of the first node voltage-stabilizing transistor T92 are connected to the touch signal input terminal TP.

In some embodiments, the first node voltage-stabilizing transistor (T91, T92) is an N-type transistor or a P-type transistor. The first node voltage-stabilizing transistor (T91, T92) is selected from any one of a low temperature polysilicon transistor, a metal oxide transistor, or a single crystal silicon transistor. Exemplarily, the first node voltage-stabilizing transistor (T91, T92) is an N-type low temperature polysilicon transistor.

In some embodiments, referring to FIG. 2, the first node voltage-stabilizing circuit 301 includes a first node control transistor T11. A source and a drain of the first node control transistor T11 are connected between the first node Q(n) and a second stage transmission signal input terminal ST(n−i) or an initial signal input terminal STV. A gate of the first node control transistor T11 is connected to the second stage transmission signal input terminal ST(n−i) or the initial signal input terminal STV. As such, the first node control transistor T11 controls the voltage level of the first node Q(n) according to a second stage transmission signal ST(N−i) or an initial signal. The second stage transmission signal ST(N−i) is input from the second stage transmission signal input terminal ST(n−i), and the initial signal is input from the initial signal input terminal STV. For example, the second-stage transmission signal ST(N−i) at the high level or the initial signal at the high level is output to the first node Q(n) to pull up the voltage level of the first node Q(n), thereby pre-charging the first node Q(n).

It should be noted that for previous few stages of the gate driving units of the gate driving circuit 100, e.g., a first stage gate driving unit, the source and the drain of the first node control transistor T11 may be connected between the initial signal input terminal STV and the first node Q(n), and the gate of the first node control transistor T11 may be connected between the initial signal input terminal STV and the first node Q(n).

For other gate driving units other than the previous stages of the gate driving units, e.g., the N-th stage gate driving unit, the source and the drain of the first node control transistor T11 may be connected between the second stage transmission signal input terminal ST(n−i) and the first node Q(n), and the gate of the first node control transistor T11 is connected to the second stage signal transmission input terminal ST(n−i).

In some embodiments, the second stage transmission signal input terminal ST(n−i) inputs the second stage transmission signal, and the second stage transmission signal is the previous-stage stage transmission signal output by the previous-stage gate driving unit (the (N−i)-th gate driving unit) of the N-th gate driving unit. Under a condition that the second stage transmission signal is the previous-stage stage transmission signal, the first node control circuit 301 may realize pre-charging of the first node Q(n) according to the previous-stage stage transmission signal, thereby increasing the charging rate of the first node Q(n).

In one exemplary embodiment, i is equal to 4, but is not limited thereto. It can be understood that i may also be 1, 2, 3, 8, etc.

In some embodiments, the first node control transistor T11 is an N-type transistor or a P-type transistor. The first node control transistor T11 is selected from any one of a low temperature polysilicon transistor, a metal oxide transistor, or a single crystal silicon transistor. Exemplarily, the first node control transistor T11 is an N-type low temperature polysilicon transistor.

In some embodiments, referring to FIG. 2, the first output circuit 303 includes a first output transistor T21. A source and a drain of the first output transistor T21 are connected between a clock signal input terminal CK(n) and the gate signal output terminal G(n). A gate of the first output transistor T21 is connected to the first node Q(n). As such, the first output transistor T21 may disconnect or connect with the clock signal input terminal CK(n) and the gate signal output terminal G(n) according to the voltage level of the first node Q(n).

The clock signal input terminal CK(n) is configured to output a clock signal. The clock signal includes a high-level clock signal and a low-level clock signal. In some embodiments, a plurality of clock signal input terminals CK(n) include clock signal input terminals from a first clock signal input terminal CK(1) to an eighth clock signal input terminal CK(8), but are not limited thereto.

In one exemplary embodiment, the first output transistor T21 is turned on according to the high level of the first node Q(n), and outputs the high-level clock signal to the gate signal output terminal G(n) as a high-level scanning signal. The high-level scanning signal is a turn-on scanning signal, which can select pixels connected to the scanning lines, so that the pixels can receive data signals. Furthermore, the first output transistor T21 is turned on according to the high level of the first node Q(n) and outputs the low-level clock signal to the gate signal output terminal G(n) as a low-level scanning signal. The low-level scanning signal is a turn-off scanning signal, which can not select the pixels connected to the scanning lines, so that the pixels cannot receive the data signals. Therefore, the scanning signal is output through the first output transistor T21.

In some embodiments, referring to FIG. 2, the first output circuit 303 may further include a second output transistor T31. A source and a drain of the second output transistor T31 are connected between the first voltage input terminal VGL and the gate signal output terminal G(n). A gate of the second output transistor T31 is connected to the first stage transmission signal input terminal ST(n+j). As such, the second output transistor T31 can pull down the voltage level of the gate signal output terminal G(n), according to the first stage transmission signal, to the low level corresponding to the first level signal.

The first stage transmission signal input terminal ST(n+j) inputs the first stage transmission signal ST(N+j). The first stage transmission signal ST(N+j) is a subsequent-stage stage transmission signal output from a subsequent-stage gate driving unit (the (N+j)-th gate driving unit) of the N-th stage gate driving unit. Under the condition that the first stage transmission signal ST(N+j) is the subsequent-stage stage transmission signal, the first output circuit 303 may pull down the first node Q(n) to a low level according to the subsequent-stage stage transmission signal.

In one exemplary embodiment, j is equal to i and equal to 4, but is not limited thereto. It can be understood that j may also be 1, 2, 3, 8, etc.

In another exemplary embodiment, under the condition that the first output transistor T21 outputs the high-level clock signal as the high-level scanning signal to the gate signal output terminal G(n), i.e., under the condition that the first output transistor T21 functions to pull up the voltage level of the gate signal output terminal G(n), the second output transistor T31 may output the first level signal at the low level as the low-level scanning signal to the gate signal output terminal G(n), i.e., the second output transistor T31 functions to pull down the voltage level of the gate signal output terminal G(n).

In some embodiments, the gate driving circuit 100 further includes a capacitor Cb. Two electrodes of the capacitor Cb are connected between the first node Q(n) and the gate signal output terminal G(n). Under the condition that the gate signal output terminal G(n) outputs the high-level scanning signal, the voltage level of the first node Q(n) is increased by self-coupling of the capacitor Cb, thereby improving the stability of the first output transistor T21 outputting the high-level scanning signal.

In some embodiments, the first maintaining circuit 302 includes a first maintaining transistor (T42, T43). A source and a drain of the first maintaining transistor (T42, T43) are connected between the first node Q(n) and the touch signal input terminal TP. A gate of the first maintaining transistor (T42, T43) is connected to the second node (K(n), P(n)). When the pre-charge stage of the display stage is switched to the touch stage, the source and the drain of the first maintaining transistor (T42, T43) are the high level of the first node Q(n) and the first level of the touch signal, respectively, and a voltage difference between the source and the drain is relatively small, thereby reducing the risk of leakage of the first node Q(n) through the first maintaining circuit 302 during the touch stage.

Furthermore, during the display stage, when the voltage level of the first node Q(n) is a high level and the voltage level of the second node (K(n), P(n)) is a low level, the first maintaining transistor (T42, T43) is turned off to maintain a high-level state of the first node Q(n). When the voltage level of the first node Q(n) is a low level and the voltage level of the second node (K(n), P(n)) is a high level, the first maintaining transistor (T42, T43) is in a turn-on state and outputs the second level of the touch signal as a low level to the first node Q(n), so as to maintain a low-level state of the first node Q(n).

In some embodiments, the first maintaining circuit 302 includes the first maintaining transistor (T42, T43). The source and the drain of the first maintaining transistor (T42, T43) can be connected between the first node Q(n) and the first voltage input terminal VGL. The gate of the first maintaining transistor (T42, T43) is connected to the second node (K(n), P(n)). As such, during the display stage, when the voltage level of the first node Q(n) is a low level and the voltage level of the second node (K(n), P(n)) is a high level, the first maintaining transistor (T42, T43) is in the turn-on state and outputs the first level signal as a low level to the first node Q(n), so as to maintain the low-level state of the first node Q(n).

In some embodiments, the first maintaining circuit 302 may include one or more first maintaining transistors (T42, T43).

In one exemplary embodiment, the first maintaining circuit 302 may include a first maintaining transistor T42 and a first maintaining transistor T43. The first maintaining transistor T42 and the first maintaining transistor T43 periodically operate alternately. A source and a drain of the first maintaining transistor T42 are connected between the first node Q(n) and the touch signal input terminal TP. A gate of the first maintaining transistor T42 is connected to the second node K(n). The first maintaining transistor T42 and the first node voltage-stabilizing transistor T91 operate in a same period. A source and a drain of the first maintaining transistor T43 are connected between the first node Q(n) and the touch signal input terminal TP. A gate of the first maintaining transistor T43 is connected to the second node P(n). The first maintaining transistor T43 and the first node voltage-stabilizing transistor T92 operate in a same period.

In some embodiments, referring to FIG. 2, the gate driving circuit 100 further includes a reset circuit 305. During the display stage, the reset circuit 305 is configured to connect the touch signal input terminal TP with the first node Q(n) according to a third level of a reset signal input to a reset signal input terminal Reset, so as to reset the voltage level of the first node Q(n), thereby alleviating the influence of the first node Q(n) on the performance of the gate driving circuit. As such, the touch signal at the second level input to the touch signal input terminal TP is fully utilized as the reset signal of the first node during the display stage.

In some embodiments, during the touch stage, the reset circuit 305 is further configured to disconnect the first node from the touch signal input terminal TP according to a fourth level of the reset signal input from the reset signal input terminal Reset. The fourth level is less than the third level. As such, the reset circuit 305 is turned on during the display stage according to a high level of the reset signal and turned off during the touch stage according to the low level of the reset signal, so as to fully utilize the touch signal at the first level or the touch signal at the second level output from the touch signal input terminal TP. Furthermore, when the pre-charging stage of the display stage is switched to the touch stage, two terminals of the reset circuit 305 turned off are connected with the high level of the first Q(n) and the first level of the touch signal, respectively, and a voltage difference between the two terminals is relatively small, thereby reducing the risk of leakage of the first node Q(n) through the reset circuit 305 during the touch stage.

In some embodiments, the reset circuit 305 further includes a reset transistor TrQ. A source and a drain of the reset transistor TrQ are connected between the first node Q(n) and the touch signal input terminal TP. A gate of the reset transistor TrQ is connected to the reset signal input terminal Reset. As such, the reset transistor TrQ can reset the voltage level of the first node during the display stage, thereby reducing the risk of leakage of the first node Q(n) through the reset transistor TrQ during the touch stage.

In other embodiments, the reset circuit 305 includes the reset transistor TrQ. The source and the drain of the reset transistor TrQ are connected between the first node Q(n) and the first voltage input terminal VGL. The gate of the reset transistor TrQ is connected to the reset signal input terminal Reset. As such, when the reset transistor TrQ is turned on during the display stage according to the high level of the reset signal, the first level signal is output to the first node Q(n) to realize the reset of the first node Q(n).

In some embodiments, referring to FIG. 2, the gate driving circuit 100 further includes a second maintaining circuit 306. During the display stage, the second maintaining circuit 306 is configured to connect the touch signal input terminal TP with the first node Q(n) according to the first stage transmission signal ST(N+j) at a fifth level input from the first stage transmission signal input terminal ST(n+j), so as to maintain the voltage level of the first node Q(n). As such, during the display stage, when the voltage level of the first node Q(n) is a low level, the second maintaining circuit 306 is turned on to output the touch signal at the second level to the first node Q(n), so as to maintain the low-level state of the first node Q(n).

In some embodiments, during the touch stage, the second maintaining circuit 306 is further configured to disconnect the first node Q(n) from the touch signal input terminal TP according to a sixth level of the first stage transmission signal ST(N+j), and the first stage transmission signal ST(N+j) is input from the first stage transmission signal input terminal ST(n+j). The sixth level is less than the fifth level. As such, when the pre-charging stage of the display stage is switched to the touch stage, two terminals of the second maintaining circuit 306 turned off are connected at the high level of the first node Q(n) and the first level of the touch signal, respectively, and a voltage difference between the two terminals is relatively small, thereby reducing the risk of leakage of the first node Q(n) through the second maintaining circuit 306 during the touch stage.

In some embodiments, the second maintaining circuit 306 includes a second maintaining transistor T41. A source and a drain of the second maintaining transistor T42 are connected between the first node Q(n) and the touch signal input terminal TP. A gate of the second maintaining transistor T41 is connected to the first stage transmission signal input terminal ST(n+j). As such, the second maintaining transistor T41 connects or disconnects the touch signal input terminal TP with the first node according to the first stage transmission signal ST(N+j) at the fifth level or the first stage transmission signal ST(N+j) at the sixth level, which are input from the first stage transmission signal output terminal ST(n+j).

In other embodiments, the second maintaining circuit 306 includes the second maintaining transistor T41. The source and the drain of the first maintaining transistor T41 are connected between the first node Q(n) and the first voltage input terminal VGL. The gate of the second maintaining transistor T41 is connected to the first stage transmission signal input terminal ST(n+j). As such, during the display stage, when the voltage level of the first node Q(n) is a low level, the second maintaining transistor T41 is turned on according to the fifth level of the first stage transmission signal ST(N+j), so as to output the first level signal to the first node Q(n) and maintain the low-level state of the first node Q(n).

In some embodiments, referring to FIG. 2, the gate driving circuit 100 further includes a second node control circuit 307. The second node control circuit 307 is configured, according to the voltage level of the first node Q(n), to make a phase of the voltage level of the second node (K(n), P(n)) to be opposite to a phase of the voltage level of the first node Q(n). As such, the second node control circuit 307 may function as an inverter.

In some embodiments, the second node control circuit 307 includes a first transistor (T51, T61) and a second transistor (T52, T62). A source and a drain of the first transistor (T51, T61) are connected between the second node (K(n), P(n)) and a second voltage input terminal (LC1, LC2). A gate of the first transistor (T51, T61) is connected to the second voltage input terminal (LC1, LC2). A source and a drain of the second transistor (T52, T62) are connected between the second node (K(n), P(n)) and the first voltage input terminal VGL. A gate of the second transistor (T52, T62) is connected to the first node Q(n). During the display stage and the touch stage, when the voltage level of the first node Q(n) is a high level, the second transistor (T52, T62) is turned on, and outputs the first level signal to the second node (K(n), P(n)), so that the voltage level of the second node (K(n), P(n)) is a low level. During the display stage and the touch stage, when the voltage level of the first node Q(n) is a low level, the second transistor (T52, T62) is turned off, the first transistor (T51, T61) is turned on and output the second level signal to the second node (K(n), P(n)), so that the voltage level of the second node (K(n), P(n)) is a high level.

In some embodiments, the second voltage input terminal (LC1, LC2) outputs the second level signal. During the display stage, the second level signal may be a high level signal. During the second phase, the second level signal may be a low level signal.

In some embodiments, referring to FIG. 2, the second node control circuit 307 may further include a fourth transistor (T53, T63). A source and a drain of the fourth transistor (T53, T63) are connected between the second node (K(n), P(n)) and one of the source and the drain of the first transistor (T51, T61). A gate of the fourth transistor (T53, T63) is connected to the second voltage input terminal (LC1, LC2). As such, driving capabilities of the fourth transistor (T53, T63) and the first transistor (T51, T61) can be reduced, so as to ensure that the second transistor (T52, T62) can realize the pull-down of the voltage level of the second node (K(n), P(n)).

In one exemplary embodiment, the second node control circuit 307 may include a first inverter 3071 and a second inverter 3072. The first inverter 3071 and the second inverter 3072 periodically operate alternately.

The first inverter 3071 includes the first transistor T51, the fourth transistor T53, and the second transistor T52. The gate of the first transistor T51 and the gate of the fourth transistor T53 are connected to the second voltage input terminal LC1. The source and the drain of the first transistor T51 and the source and the drain of the fourth transistor T53 are connected between the second voltage input terminal LC1 and the second node K(n). The source and the drain of the second transistor T52 are connected between the second node K(n) and the first voltage input terminal VGL, and the gate of the second transistor T52 is connected to the first node Q(n).

The second inverter 3072 includes the first transistor T61, the fourth transistor T63, and the second transistor T62. The gate of the first transistor T61 and the gate of the fourth transistor T52 are connected to the second voltage input terminal LC2. The source and the drain of the first transistor T61 and the source and the drain of the fourth transistor T63 are connected between the second voltage input terminal LC2 and the second node P(n). The source and the drain of the second transistor T62 are connected between the second node P(n) and the first voltage input terminal VGL, and the gate of the second transistor T52 is connected to the first node Q(n).

In some embodiments, referring to FIG. 2, the second node control circuit 307 is further configured to pull down the level voltage of the second node (K(n), P(n)) according to the second stage transmission signal ST(N−i) before the voltage level of the first node Q(n) is pulled up. Before the voltage level of the first node Q(n) is pulled up, the voltage level of the second node (K(n), P(n)) is pulled down, and the risk of leakage of the first node Q(n) through the first maintaining circuit 302 can be reduced, so as to ensure the charging rate of the first node Q(n) by the first node control circuit 301 according to the second stage transmission signal ST(N–i).

In some embodiments, the second node control circuit 307 may further include a third transistor (T54, T64). A source and a drain of the third transistor (T54, T64) are connected between the second node (K(n), P(n)) and the first voltage input terminal VGL, and a gate of the third transistor (T54, T64) is connected to the second stage transmission signal input terminal ST(n–i). As such, before the voltage level of the first node Q(n) is pulled up, the voltage level of the second node (K(n), P(n)) is pulled down by the third transistor (T54, T64) according to the second stage transmission signal ST(N–i), and the risk of leakage of the first node Q(n) through the first maintaining circuit 302 can be reduced, so as to ensure the charging rate of the first node Q(n) by the first node control circuit 301 according to the second stage transmission signal ST(N–i).

In some embodiments, a number of the third transistors (T54, T64) may be one or more.

In one exemplary embodiment, the second node control circuit 307 includes a third transistor T54 and a third transistor T64. The third transistor T54 and the third transistor T64 periodically operate alternately. A source and a drain of the third transistor T54 are connected between the second node K(n) and the first voltage input terminal VGL. A source and a drain of the third transistor T64 are connected between the second node P(n) and the first voltage input terminal VGL.

In some embodiments, any one of the transistors from the first transistor (T51, T61) to the fourth transistor (T53, T63) is an N-type transistor or a P-type transistor. Any one of the transistors from the first transistor (T51, T61) to the fourth transistor (T53, T63) is selected from any one of a low temperature polysilicon transistor, a metal oxide transistor, or a single crystal silicon transistor. Exemplarily, the transistors from the first transistor (T51, T61) to the fourth transistor (T53, T63) are N-type low temperature polysilicon transistors.

In some embodiments, the gate driving circuit 100 further includes a third maintaining circuit 308. The third maintaining circuit 308 is configured to maintain the voltage level of the gate signal output terminal G(n) according to the voltage level of the second node (K(n), P(n)). During the display stage, when the voltage level of the second node (K(n), P(n)) is a low level, the third maintaining circuit 308 is turned off to ensure that the gate signal output terminal G(n) stably outputs a high voltage level. During the display stage, when the voltage level of the second node (K(n), P(n)) is high, the third maintaining circuit 308 is turned on, and the third maintaining circuit 308 pulls down the level voltage of the gate signal output terminal G(n), so as to maintain the level voltage of the gate signal output terminal G(n) at a low level.

In some embodiments, the third maintaining circuit 308 includes a third maintaining transistor (T32, T33). A source and a drain of the third transistor (T32, T33) are connected between the gate signal output terminal G(n) and the first voltage input terminal VGL, and a gate of the third transistor (T32, T33) is connected to the second node (K(n), P(n)).

In one exemplary embodiment, the third maintaining circuit 308 includes the third maintaining transistor T32 and the third maintaining transistor T33. The third maintaining transistor T32 and the third maintaining transistor T33 periodically operate alternately. The source and the drain of the third maintaining transistor T32 are connected between the second node K(n) and the first voltage input terminal VGL. The source and the drain of the third maintaining transistor T33 are connected between the second node P(n) and the first voltage input terminal VGL.

In some embodiments, the gate driving circuit 100 further includes a second output circuit 309. The second output circuit 309 is configured to output a third stage transmission signal ST(N) from the third stage transmission signal output terminal ST(n) according to the voltage level of the first node Q(n). As such, the second output circuit 309 outputs the third stage transmission signal ST(N) as a current-stage stage transmission signal to act as a signal of the other stage gate driving circuit 100.

In some embodiments, the second output circuit 309 includes a third output transistor T22. A source and a drain of the third output transistor T22 are connected between the third stage transmission signal output terminal St (n) and the clock signal input terminal CK(n), and a gate of the third output transistor T22 is connected to the first node Q(n). As such, the third output transistor T22 connects or disconnect the third stage transmission signal output terminal ST(n) and the clock signal input terminal CK(n) according to the voltage level of the first node Q(n).

In some embodiments, any one of the transistors from the first output transistor T21 to the third output transistor T22 is an N-type transistor or a P-type transistor. Any one of the transistors from the first output transistor T21 to the third output transistor T22 is selected from any one of a low temperature polysilicon transistor, a metal oxide transistor, and a single crystal silicon transistor. Exemplarily, the transistors from the first output transistor T21 to the third output transistor T22 are N-type low temperature polysilicon transistors.

In some embodiments, the gate driving circuit 100 further includes a fourth maintaining circuit 310. The fourth maintaining circuit 310 is configured to maintain the voltage level of the third stage transmission signal output terminal ST(n) according to the voltage level of the second node (K(n), P(n)). As such, during the display stage, when the voltage level of the second node (K(n), P(n)) is a low level, the fourth maintaining circuit 310 is turned off to maintain the third stage transmission signal output terminal ST(n) to stably output the third stage transmission signal ST(N). During the display stage, when the voltage level of the second node (K(N), P(N)) is a high level, the fourth maintaining circuit 310 is turned on to pull down the third stage transmission signal ST(N) and maintain the third stage transmission signal ST(N) at a low voltage level.

In some embodiments, the fourth maintaining circuit 310 includes a fourth maintaining transistor (T72, T73). A source and a drain of the fourth maintaining transistor (T72, T73) are connected between the third stage transmission signal output terminal ST(n) and the first voltage input terminal VGL, and a gate of the fourth maintaining transistor (T72, T73) is connected to the second node (K(n), P(n)).

In some embodiments, the fourth maintaining circuit 310 may include one or more fourth maintaining transistors (T72, T73).

In one exemplary embodiment, the fourth maintaining circuit 310 includes the fourth maintaining transistor T72 and the fourth maintaining transistor T73. The source and the drain of the fourth maintaining transistor T72 are connected between the third stage transmission signal output terminal ST(n) and the first voltage input terminal VGL, and the gate of the fourth maintaining transistor T72 is connected to the second node K(n). The source and the drain of the fourth maintaining transistor T73 are connected between the third stage transmission signal output terminal ST(n) and the first voltage input terminal VGL, and the gate of the fourth maintaining transistor T73 is connected to the second node P(n).

In some embodiments, any one of the transistors from the first maintaining transistor (T42, T43) to fourth maintaining transistor (T72, T73) is an N-type transistor or a P-type transistor. Any one of the transistors from the first maintaining transistor (T42, T43) to the fourth maintaining transistor (T72, T73) is selected from any one of a low temperature polysilicon transistor, a metal oxide transistor, and a single crystal silicon transistor. Exemplarily, the transistors from the first maintaining transistor (T42, T43) to the fourth maintaining transistor (T72, T73) are N-type low temperature polysilicon transistors.

It should be noted that the first node voltage-stabilizing transistor T91, the first inverter 3071, the third transistor T54, the first maintaining transistor T42, the fourth maintaining transistor T72, and the third maintaining transistor T32 constitute a first maintaining circuit group. The transistors in the first maintaining circuit group operate in coordination during one cycle. The first node voltage-stabilizing transistor T92, the second inverter 3072, the third transistor T64, the first maintaining transistor T43, the fourth maintaining transistor T73, and the third maintaining transistor T33 constitute a second maintaining circuit group. The transistors in the second maintaining circuit group operate in coordination during one cycle. The first maintaining circuit group and the second maintaining circuit group periodically operate in an alternating manner, e.g., operate alternatively at a cycle of 100 frames, so that the service life of the first maintaining circuit group and the second maintaining circuit group is extended, and the service life of the gate driving circuit 100 is extended.

In some embodiments, the gate driving circuit 100 further includes a touch voltage-stabilizing circuit 311. The touch voltage-stabilizing circuit 311 is configured to be turned on according to the touch signal at the first level during the touch stage to stabilize the voltage level of the gate signal output terminal G(n). During the display stage, the first node voltage-stabilizing circuit 311 is further configured to be turned off according to the touch signal at the second level input from the touch signal input terminal TP, and the second level is less than the first level. As such, during the display stage, the touch voltage-stabilizing circuit 311 is turned off to reduce its influence on the display process. During the touch stage, the touch voltage-stabilizing circuit 311 is turned on to pull down the voltage level of the gate signal output terminal G(n), so as to pause the process for selecting the scanning lines by the gate driving circuit 100.

In some embodiments, the touch voltage-stabilizing circuit 311 includes a touch voltage-stabilizing transistor T81. A source and a drain of the touch voltage-stabilizing transistor T81 are connected between the gate signal output terminal G(n) and the first voltage input terminal VGL. A gate of the touch voltage-stabilizing transistor T81 is connected to the touch signal input terminal TP.

In some embodiments, the touch voltage-stabilizing transistor T81 is an N-type transistor or a P-type transistor. The touch voltage-stabilizing transistor T81 is selected from any one of a low temperature polysilicon transistor, a metal oxide transistor, or a single crystal silicon transistor. Exemplarily, the touch voltage-stabilizing transistor T81 is an N-type low temperature polysilicon transistor.

Figure 3:
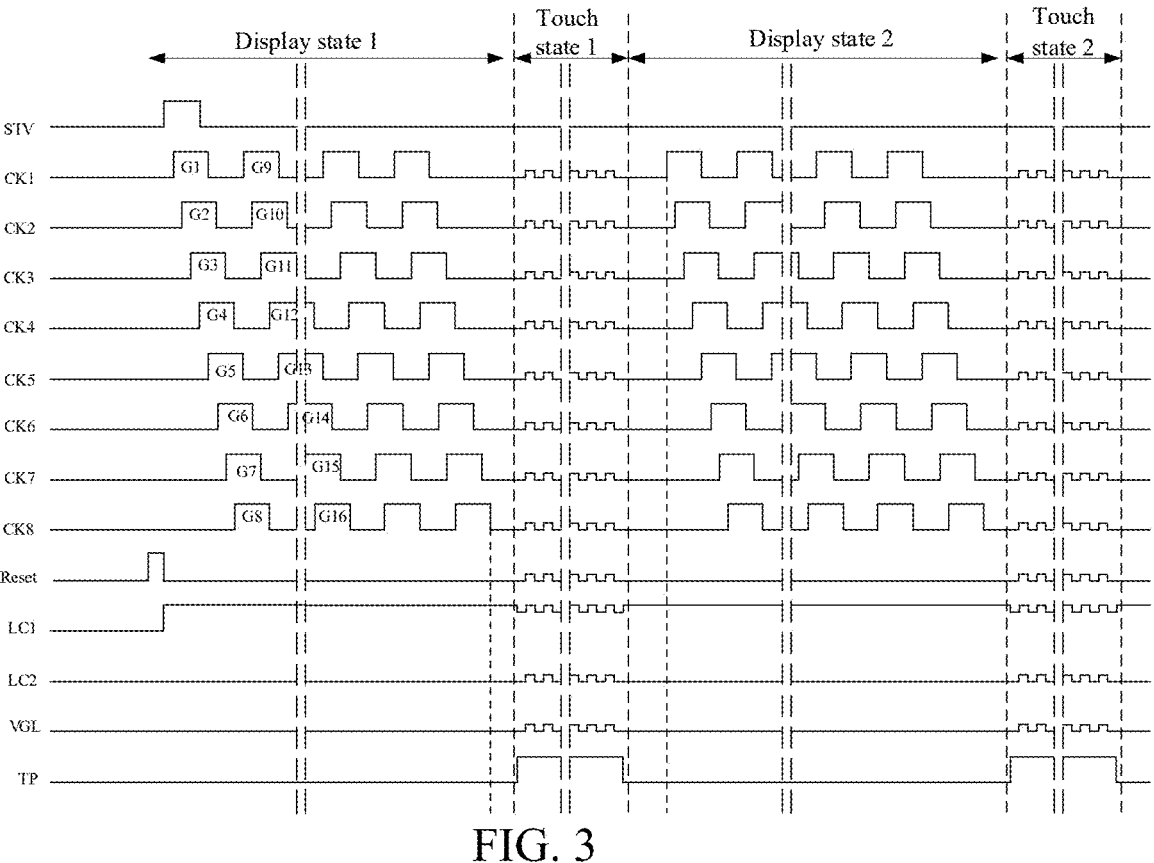
FIG. 3 is an operation timing diagram of a gate driving circuit according to some embodiments of the present disclosure.

Referring to FIG. 2 in combination with FIG. 3, operation processes of the gate driving circuit 100 according to the embodiments of the present disclosure during the display stage (e.g., the display stage 1 and the display stage 2 in FIG.

3) and the touch stage (e.g., the touch stage 1 and the touch stage 2 in FIG. 2) will be described below. The display stage may include a first stage, a second stage, a third stage, a fourth stage, and a fifth stage.

During the first stage, i.e., a reset stage, the reset signal input terminal Reset outputs a reset signal at the third level, and the reset transistor TrQ is turned on and outputs the touch signal at the second level to the first node, thereby realizing the reset of the first node Q(n).

During the second stage, i.e., a pre-charge stage, the second stage transmission signal input terminal ST(n−i) inputs the second stage transmission signal at a high level, and the first node control transistor T11 is turned on and charge the first node Q(n), so as to pull up the voltage level of the first node Q(n).

During the third stage, i.e., a pull-up stage, the first node Q(n) has a high voltage level, and the clock signal input terminal CK(n) inputs the high-level clock signal, the first output transistor T21 outputs the high-level clock signal as a first stage transmission signal ST(N+j) to the first stage transmission signal input terminal ST(n+j), and the third output transistor T22 outputs the high-level clock signal as a gate signal to the gate signal output terminal G(n). Furthermore, the capacitor Cb bootstraps the voltage level of the first node Q(n) according to the high-level clock signal output from the gate signal by self-coupling, thereby further increasing the voltage level of the first node Q(n). As such, both the voltage level of the gate signal output terminal G(n) and the voltage level of the first stage transmission signal input terminal ST(n+j) are pulled up to a high level.

During the fourth stage, i.e., a pull-down stage, the first node Q(n) has a high voltage level, and the clock signal input terminal CK(n) inputs the low-level clock signal. The first output transistor T21 outputs the low-level clock signal as the first stage transmission signal ST(N+j) to the first stage transmission signal input terminal ST(n+j). The third output transistor T22 outputs the low-level clock signal as the gate signal to the gate signal output terminal G(n). As such, both the voltage level of the gate signal output terminal G(n) and the voltage level of the first stage transmission signal input terminal ST(n+j) are pulled down to a low level.

During the fifth stage, i.e., a pull-down maintaining stage, the second voltage input terminal LC1 outputs the second level signal at a high level, the first transistor T51 and the fourth transistor T53 are turned on to pull up the voltage level of the second node K(n). The first maintaining transistor T42 and the second maintaining transistor T41 are turned on according to the high level of the second node K(n), so as to pull down the level voltage of the first node Q(n) to the first voltage level at a low level. The third maintaining transistor T32 is turned on according to the high level of the second node K(n), so as to pull down the level voltage of the gate signal output terminal G(n) to the low level of the first voltage level. The fourth maintaining transistor T72 is turned on according to the high level of the second node, so as to pull down the voltage level of the third stage transmission signal output terminal ST(n) to the low level of the first voltage level. As such, the voltage levels of the first node Q(n), the gate signal output terminal G(n), and the third stage transmission signal input terminal ST(n+j) are pulled down to a low level.

In addition, during the entire display stage, the touch signal of the second level input from the touch signal input terminal TP is input, so that the first node voltage-stabilizing transistors (T91, T92) is in a turn-off state.

During the touch stage, the clock signal input terminal CK(n) outputs a low-level pulse signal, e.g., pulse signals from CK1 to CK8 are all low-level pulse signals. Furthermore, the reset signal input terminal Reset, the first voltage input terminal VGL, and the second voltage input terminal LC1 also output pulse signals at a low level. As such, the gate driving unit stops outputting the high-level scanning signals. Furthermore, the touch signal input terminal TP inputs the touch signal at the first level, the touch regulator transistor T81 is turned on, and the pulse signals at the low level input from the first voltage input terminal VGL are output to the gate signal output terminal G(n), and the voltage level of the gate signal output terminal G(n) is stabilized at the low level.

Figure 4:
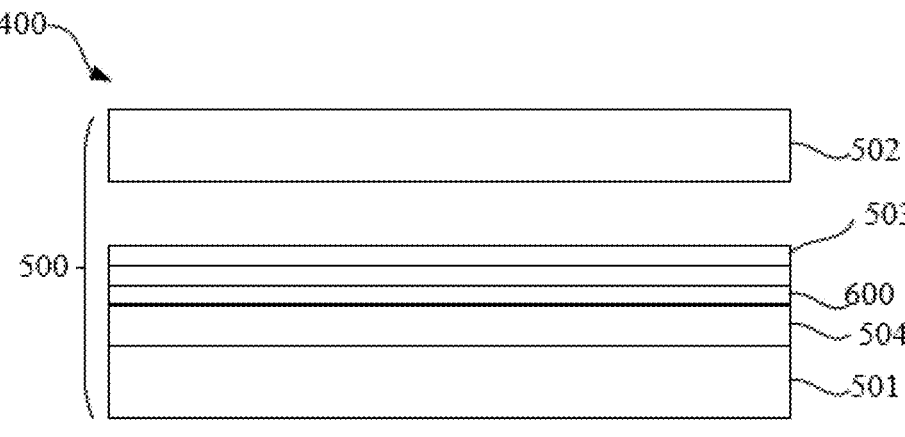
FIG. 4 is a schematic cross-sectional structural view of a display device according to some embodiments of the present disclosure.

Based on the same inventive concept, referring to FIG. 4, a display panel 400 is further provided by the embodiments of the present disclosure. The display device 400 includes a display panel 500 and a touch layer 600. The touch layer 600 may be used in conjunction with a stylus and sense a touch signal emitted by the stylus to display information input by users through the stylus on the display panel 500.

The touch layer 600 includes a plurality of touch electrodes. In some embodiments, the touch electrodes may be self-capacitive touch electrodes or mutual-capacitive touch electrodes. In one exemplary embodiment, the touch electrodes are self-capacitive touch electrodes.

In some embodiments, referring to FIG. 4, the touch layer 600 may be integrated inside the display panel 500 to thin a thickness of the display device 400.

In some embodiments, under the condition that the touch layer 600 may be integrated inside the display panel 500, the touch layer 600 may be multiplexed as an electrode layer.

In some embodiments, the touch layer 600 may be multiplexed as a common electrode layer. Furthermore, the plurality of touch electrodes are multiplexed into a plurality of common electrodes. With the design of the gate driving circuit 100 described above, under the condition that the plurality of touch electrodes are multiplexed into the plurality of common electrodes, the display abnormality caused by stopping selecting the scanning lines during the touch stage can be alleviated.

In some embodiments, the display panel 500 further includes a substrate 501. Under the condition that the touch layer 600 may be integrated inside the display panel 500, the touch layer 600 may be located on the substrate 501.

In some embodiments, the display panel 500 may include a pixel electrode layer 503, and the pixel electrode layer 503 and the common electrode layer are insulated by an insulating layer. The pixel electrode layer 503 is disposed on the substrate 501.

In some embodiments, the display panel 500 may further include a gate driving circuit 504. The driving circuit layer 504 includes a pixel driving circuit. The driving circuit layer 504 is located between the pixel electrode layer 503 and the substrate 501 and between the common electrode layer and the substrate 501.

In some embodiments, the display panel 500 further includes an opposite substrate 502. The opposite substrate 501 is arranged opposite to the substrate 502.

In some embodiments, a liquid crystal layer (not shown in the figures) may be disposed between the opposite substrate 502 and the substrate 501. Furthermore, the display panel 500 is a liquid crystal display panel.

In some embodiments, the touch layer 600 may be located outside the display panel 500. The touch layer 600 may be formed on the display panel 500 by a panel manufacturing process, or may be bonded to the display panel 500 by an adhesive layer.

The description of the above embodiments is merely provided to help understand the technical solution and the core idea of the present disclosure. Those skilled in the field should understand that they can still modify the technical solutions described in the preceding embodiments, or make equivalent substitutions for certain technical features, and such modifications or substitutions will not deviate from the scope of the corresponding technical solution in each embodiment of the application.

What is claimed is:

1. A gate driving circuit, comprising:
a first node control circuit configured to control a voltage level of a first node;
a first maintaining circuit configured to maintain the voltage level of the first node according to a voltage level of a second node;
a first output circuit configured to output a gate signal from a gate signal output terminal according to the voltage level of the first node; and
a first node voltage-stabilizing circuit configured to be turned on, during a touch stage, according to a first level of a touch signal to control the voltage level of the second node, such that the first maintaining circuit is turned off to stabilize the voltage level of the first node, wherein the touch signal is input from a touch signal input terminal.

2. The gate driving circuit according to claim 1, wherein the first node voltage-stabilizing circuit is further configured to be turned off, during a display stage, according to a second level of the touch signal, and the second level is less than the first level.

3. The gate driving circuit according to claim 2, wherein the first node voltage-stabilizing circuit comprises a first node voltage-stabilizing transistor, a source and a drain of the first node voltage-stabilizing transistor are connected between the second node and a first voltage input terminal, and a gate of the first node voltage-stabilizing transistor is connected to the touch signal input terminal.

4. The gate driving circuit according to claim 1, wherein the first maintaining circuit comprises a first maintaining transistor, a source and a drain of the first maintaining transistor are connected between the first node and the touch signal input terminal, and a gate of the first maintaining transistor is connected to the second node.

5. The gate driving circuit according to claim 1, further comprising a reset circuit, wherein during a display stage, the reset circuit is configured to connect the first node with the touch signal input terminal according to a third level of a reset signal to reset the voltage level of the first node, and the reset signal is input from a reset signal input terminal; and/or,
wherein during the touch stage, the reset circuit is further configured to disconnect the first node from the touch signal input terminal according to a fourth level of the reset signal, and the fourth level is less than the third level.

6. The gate driving circuit according to claim 5, wherein the reset circuit comprises a reset transistor, a source and a drain of the reset transistor are connected between the first node and the touch signal input terminal, and a gate of the reset transistor is connected to the reset signal input terminal.

7. The gate driving circuit according to claim 1, further comprising a second maintaining circuit, wherein during a display stage, the second maintaining circuit is configured to connect the touch signal input terminal with the first node according to a fifth level of a first stage transmission signal to maintain the voltage level of the first node, and the first stage transmission signal is input from a first stage transmission signal input terminal; and/or, wherein during the touch stage, the second maintaining circuit is further configured to disconnect the first node from the touch signal input terminal according to a sixth level of the first stage transmission signal, and the sixth level is less than the fifth level.

8. The gate driving circuit according to claim 7, wherein the second maintaining circuit comprises a second maintaining transistor, a source and a drain of the second maintaining transistor are connected between the first node and the touch signal input terminal, and a gate of the second maintaining transistor is connected to the first stage transmission signal input terminal.

9. The gate driving circuit according to claim 1, further comprising a second node control circuit, wherein the second node control circuit is configured, according to the voltage level of the first node, to make a phase of the voltage level of the second node to be opposite to a phase of the voltage level of the first node.

10. The gate driving circuit according to claim 9, wherein the second node control circuit comprises a first transistor and a second transistor;

wherein a source and a drain of the first transistor are connected between the second node and a second voltage input terminal, and a gate of the first transistor is connected to the second voltage input terminal; and wherein a source and a drain of the second transistor are connected between the second node and a first voltage input terminal, and a gate of the second transistor is connected to the first node.

11. The gate driving circuit according to claim 10, wherein the second node control circuit further comprises a third transistor, a source and a drain of the third transistor are connected between the second node and the first voltage input terminal, and a gate of the third transistor is connected to a second stage transmission signal input terminal.

12. The gate driving circuit according to claim 1, wherein the first node control circuit comprises a first node control transistor, a source and a drain of the first node control transistor are connected between the first node and a second stage transmission signal input terminal or an initial signal input terminal, and a gate of the first node control transistor is connected to the second stage transmission signal input terminal or the initial signal input terminal; and/or, wherein the first output circuit comprises a first output transistor, a source and a drain of the first output transistor are connected between a clock signal input terminal and the gate signal output terminal, the clock signal input terminal is configured to input an input clock signal, and a gate of the first output transistor is connected to the first node; and/or, wherein the first output circuit comprises a second output transistor, a source and a drain of the second output transistor are connected between a first voltage input terminal and the gate signal output terminal, the first voltage input terminal is configured to input a first level signal, a gate of the second output transistor is connected to a first stage transmission signal input terminal, and the first stage transmission signal input terminal is configured to input the first stage transmission signal; and/or, wherein the gate driving circuit further comprises a capacitor, and two electrodes of the capacitor are connected between the first node and the gate signal output terminal.

13. The gate driving circuit according to claim 1, further comprising a third maintaining circuit, wherein the third maintaining circuit is configured, according to the voltage level of the second node, to maintain a voltage level of the gate signal output terminal.

14. The gate driving circuit according to claim 13, wherein the third maintaining circuit comprises a third maintaining transistor, a source and a drain of the third maintaining transistor are connected between the gate signal output terminal and a first voltage input terminal, and a gate of the third maintaining transistor is connected to the second node.

15. The gate driving circuit according to claim 1, further comprising a second output circuit, wherein the second output circuit is configured, according to the voltage level of the first node, to output a third stage transmission signal from a third stage transmission signal output terminal.

16. The gate driving circuit according to claim 15, further comprising a fourth maintaining circuit, wherein the fourth maintaining circuit is configured, according to the level voltage of the second node, to maintain a voltage level of the third stage transmission signal output terminal.

17. The gate driving circuit according to claim 16, wherein the second output circuit comprises a third output transistor, a source and a drain of the third output transistor are connected between the third stage transmission signal output terminal and a clock signal input terminal, and a gate of the third output transistor is connected to the first node; and/or, wherein the fourth maintaining circuit comprises a fourth maintaining transistor, a source and a drain of the fourth maintaining transistor are connected between the third stage transmission signal output terminal and a first voltage input terminal, and a gate of the fourth maintaining transistor is connected to the second node.

18. The gate driving circuit according to claim 1, further comprising a touch voltage-stabilizing circuit, wherein during the touch stage, the touch voltage-stabilizing circuit is configured to be turned on according to the first level of the touch signal to stabilize a voltage level of the gate signal output terminal; wherein during the display stage, the touch voltage-stabilizing circuit is further configured to be turned off according to a second level of the touch signal, and the second level is less than the first level.

19. The gate driving circuit according to claim 18, wherein the touch voltage-stabilizing circuit comprises a touch voltage-stabilizing transistor, a source and a drain of the touch voltage-stabilizing transistor are connected between the gate signal output terminal and a first voltage input terminal, and a gate of the touch voltage-stabilizing transistor is connected to the touch signal input terminal.

20. A display device, comprising a gate driving circuit, wherein the gate driving circuit, comprising:

a first node control circuit configured to control a voltage level of a first node;

a first maintaining circuit configured to maintain the voltage level of the first node according to a voltage level of a second node;

a first output circuit configured to output a gate signal from a gate signal output terminal according to the voltage level of the first node; and a first node voltage-stabilizing circuit configured to be turned on, during a touch stage, according to a first level of a touch signal to control the voltage level of the second node, such that the first maintaining circuit is turned off to stabilize the voltage level of the first node, wherein the touch signal is input from a touch signal input terminal.

* * * * *